United States Patent
Setiawan et al.

(10) Patent No.: US 9,746,931 B2
(45) Date of Patent: Aug. 29, 2017

(54) IMAGE PROCESSING DEVICE AND IMAGE DISPLAY DEVICE

(71) Applicant: HITACHI MAXELL, LTD., Osaka (JP)

(72) Inventors: Bondan Setiawan, Yamato (JP); Takashi Matsubara, Chigasaki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/755,776

(22) Filed: Jun. 30, 2015

(65) Prior Publication Data
US 2015/0301612 A1 Oct. 22, 2015

Related U.S. Application Data

(63) Continuation of application No. 13/307,058, filed on Nov. 30, 2011, now Pat. No. 9,086,726.

(30) Foreign Application Priority Data

Dec. 27, 2010 (JP) .................................. 2010-289122

(51) Int. Cl.
*H04N 7/18* (2006.01)
*G06K 9/00* (2006.01)
(Continued)

(52) U.S. Cl.
CPC .............. *G06F 3/017* (2013.01); *G06F 3/005* (2013.01); *G06F 3/011* (2013.01)

(58) Field of Classification Search
CPC ........... G06F 3/005; G06F 3/011; G06F 3/017
See application file for complete search history.

(56) References Cited

U.S. PATENT DOCUMENTS 5,594,469 A * 1/1997 Freeman .............. G05B 19/106
345/157
7,593,552 B2 9/2009 Higaki et al.
(Continued)

FOREIGN PATENT DOCUMENTS

CN 101344816 A 1/2009
CN 101393477 A 3/2009
(Continued)

OTHER PUBLICATIONS

Chen et al. (Controlling Your TV with Gestures) MIR'10, Mar. 29-31, 2010.*
(Continued)

*Primary Examiner* — Tsion B Owens
(74) *Attorney, Agent, or Firm* — Baker Botts L.L.P.

(57) ABSTRACT

The input device and the input system include a hand detection means which detects the position of the hand, a body part detection means which detects positions of user's body parts such as the face, for example, a relative position calculation means which calculates a relative position of the hand with respect to body parts from hand position information being a detection result of the hand detection means and body part position information being a detection result of the body part detection means, and a gesture recognition means which recognizes a hand gesture on the basis of a change in the hand position information being the detection result of the hand detection means, wherein when a hand gesture is recognized, the operation of the input device with respect to the user's gesture is changed according to a relative position of the hand with respect to body parts.

4 Claims, 16 Drawing Sheets

(51) Int. Cl.
G06F 3/01 (2006.01)
G06F 3/00 (2006.01)

(56) References Cited

U.S. PATENT DOCUMENTS

| | | | |
|---|---|---|---|
| 2008/0019589 A1* | 1/2008 | Yoon | G06K 9/00355 382/165 |
| 2009/0027337 A1 | 1/2009 | Hildreth | |
| 2009/0262187 A1* | 10/2009 | Asada | G06F 3/017 348/77 |
| 2011/0273551 A1 | 11/2011 | Yang et al. | |
| 2012/0223882 A1* | 9/2012 | Galor | G06F 3/011 345/157 |
| 2013/0169537 A1 | 7/2013 | Tsurumi et al. | |
| 2013/0181897 A1* | 7/2013 | Izumi | G06F 3/017 345/156 |
| 2014/0043234 A1 | 2/2014 | Eilat et al. | |

FOREIGN PATENT DOCUMENTS

| | | |
|---|---|---|
| JP | 2003-233452 A | 8/2003 |
| JP | 2004-302992 A | 10/2004 |
| JP | 2006-209563 A | 8/2006 |
| JP | 2007-072564 A | 3/2007 |
| JP | 2009-301215 A | 12/2009 |
| JP | 2010-541398 A | 12/2010 |
| WO | WO 2007/029393 A1 | 3/2007 |
| WO | WO 2009/042579 A1 | 4/2009 |
| WO | WO 2010/085221 A1 | 7/2010 |

OTHER PUBLICATIONS

Chinese Office Action for Chinese Application No. 201110386052.3, issued on Feb. 28, 2014.
JP Office Action for Japanese Application No. 2010-289122, issued on Oct. 15, 2013.

* cited by examiner

FIG. 9
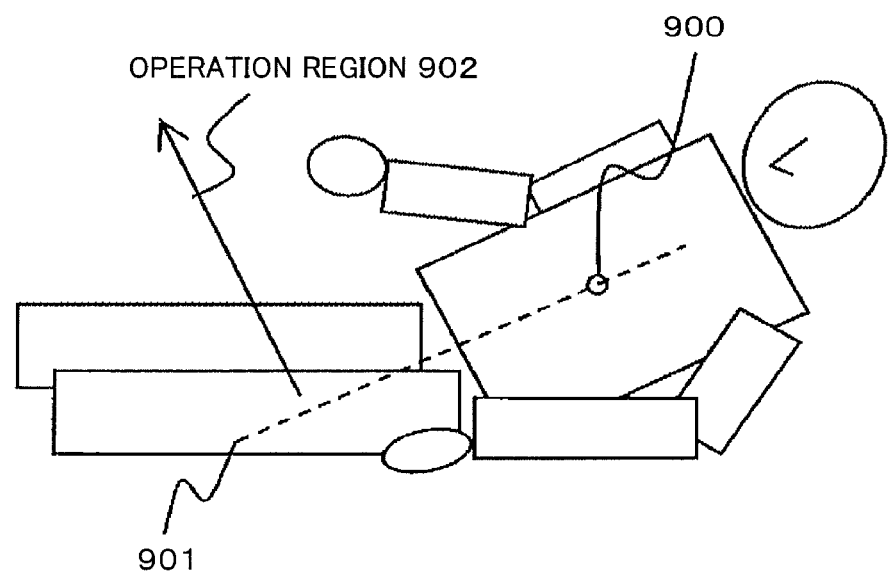
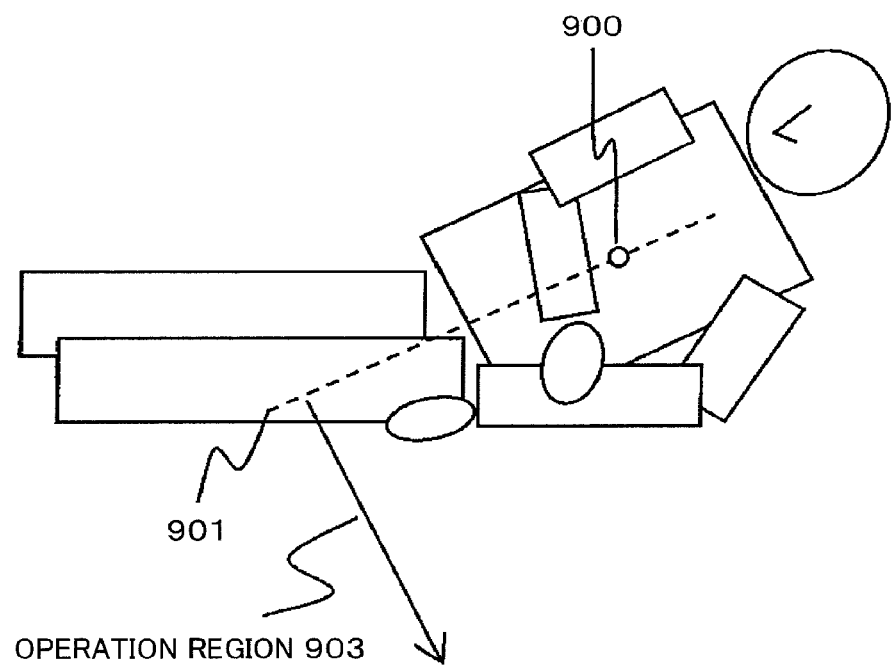

FIG. 10
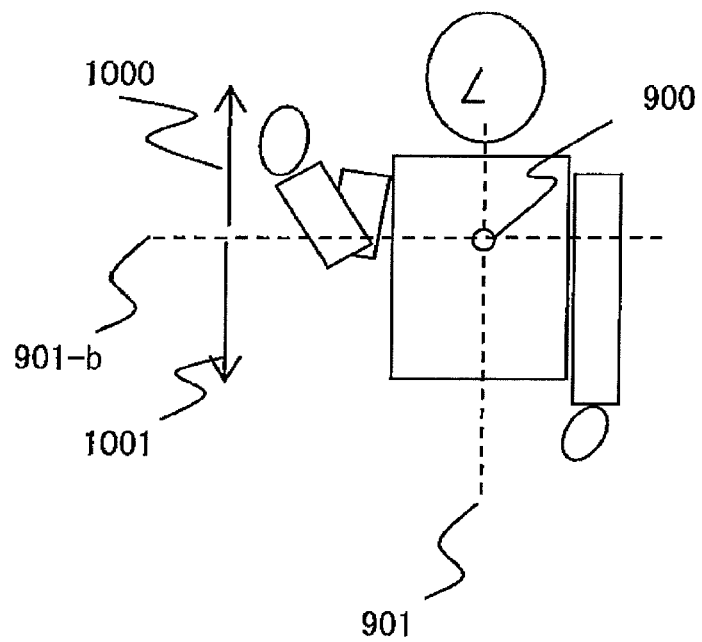
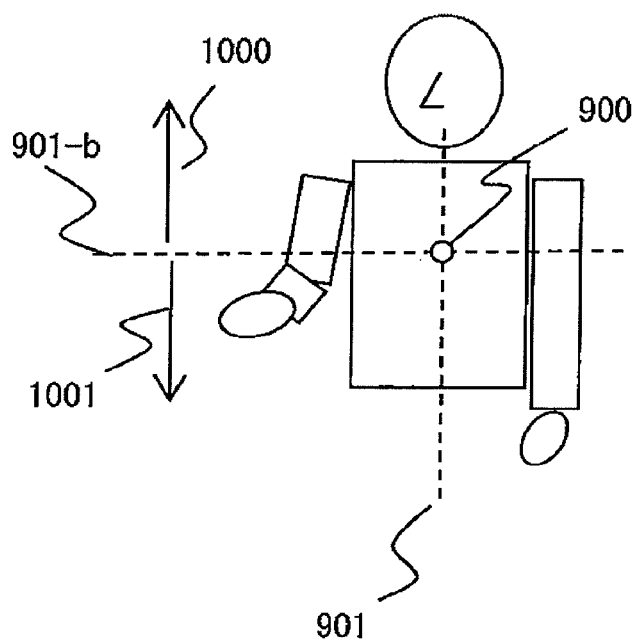

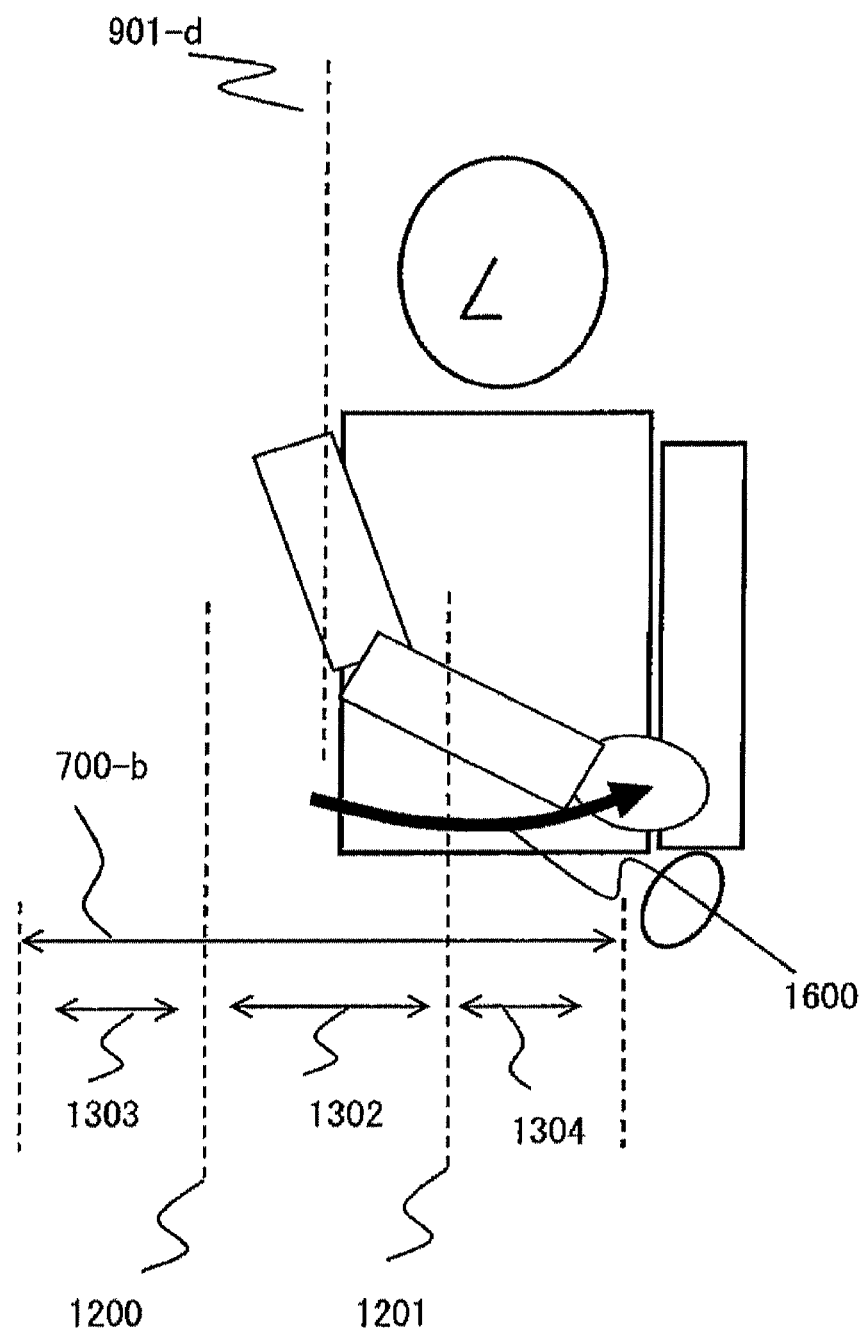

IMAGE PROCESSING DEVICE AND IMAGE DISPLAY DEVICE

INCORPORATION BY REFERENCE

This application is a continuation of U.S. patent application Ser. No. 13/307,058, filed Nov. 30, 2011, which claims priority to Japanese Patent Application No. 2010-289122, filed Dec. 27, 2010, the entire disclosure of which is incorporated herein by reference.

BACKGROUND OF THE INVENTION (1) Field of the Invention

The present invention relates to the operation of electronic devices.

(2) Description of the Related Art

An invention disclosed by a Japanese Patent Application Laid-Open No. 2003-233452 (hereinafter, referred to as Patent Document 1) is known as a prior art in the field of the present invention. The Patent Document 1 describes that an object of the prior art is "to provide a user-friendly gesture command input device which allows a user to input a command by using a user's favorite gesture irrespective of applications or gesture commands arbitrarily registered by other users and provides an input means which recognizes a specific user performing a gesture input and allows multiple users to perform command inputs by using gestures specific to the user" (see [0013] of Patent Document 1), and also describes that the prior art provides, as means for solving the problem, "a gesture command input device which converts a gesture input performed with respect to an input means to a command, the gesture input being performed by using a user's body part or a dedicated command medium, the gesture command input device including: a storage means in which user-specific gesture commands are pre-registered per user, a user recognition means which recognizes the user who performs the gesture input with respect to the input means, and a control means which, when the user recognition means recognizes the user who performs the gesture input with respect to the input means, converts a gesture input by the user through the input means to a command based on a user-specific gesture command registered in the storage means in association with the recognized user" (see [0025] of Patent Document 1).

SUMMARY OF THE INVENTION

The device according to the technical idea of the Patent Document 1, however, is not easy for users to operate, since pre-registered gestures need to be stored in electronic units.

In order to solve the above problem, the present invention adopts, for example, the configurations claimed in the appended Claims.

The present invention provides a plurality of means to solve the above problem. One example is an image processing device configured to output the image signal, the image processing device including a camera configured to capture the image, and a control unit configured to control the image processing device based on the image captured by the camera, wherein the control unit detects user's multiple body parts from the image captured by the camera, selects a type of the operation with respect to the image processing device based on positions of the detected multiple body parts, and when recognizing a user's predetermined gesture from the image captured by the camera, executes an operation of the selected type.

The above-mentioned means enables efficient operations of the electronic units by the gesture and improves user's usability of the electronic units.

BRIEF DESCRIPTION OF THE DRAWINGS

These and other features, objects and advantages of the present invention will become more apparent from the following description when taken in conjunction with the accompanying drawings wherein:

FIG. 9 is a schematic view of an input device according to a third embodiment, showing operation regions of the user's hand with reference to the user's trunk axis, FIG. 10 is a schematic view of the input device according to the third embodiment, showing the operation regions of the user's hand with respect to the longitudinal position at the center point of the user's trunk, FIG. 16 is a schematic view of an input device according to a fifth embodiment, showing the user's gesture.

DETAILED DESCRIPTION OF THE EMBODIMENTS

Hereinafter, embodiments of the present invention are described with reference to drawings.

First Embodiment

An input device 100 according to the present embodiment is a device capable of detecting the position of a user's body part from a moving image captured from the user, detecting the user's motion (hereinafter referred to as "gesture"), and according to the detected motion, executing a predetermined processing and also changing the display of the GUI (abbreviation of Graphical User Interface).

Figure 1:
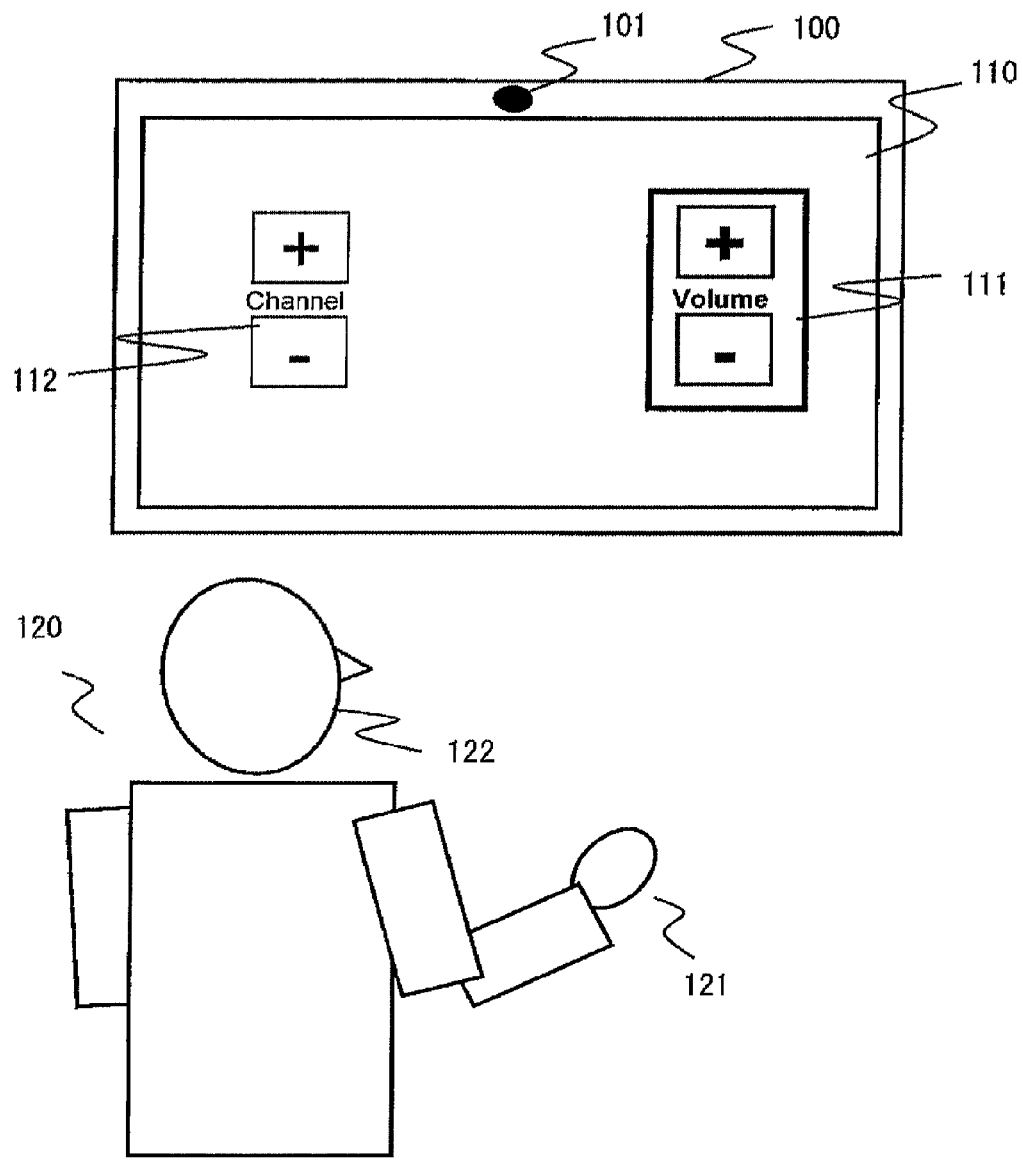
FIG. 1 is a schematic view showing an input device according to a first embodiment.

FIG. 1 is a schematic view of an operation environment in which the user operates the input device 100.

An imaging unit 101 is a camera for inputting a moving image to the input device 100. A display unit 110 is a display provided in the input device and formed by such a display apparatus as, for example, a liquid crystal display, plasma display, or the like. The display unit 110 includes a display panel, a panel control circuit, and a panel control driver, and displays an image formed by data supplied from an image processing unit 210 which is be described later, to a display panel.

A first menu 111 and a second menu 112 are GUIs displayed on the display unit 111, each of which is associated with a predetermined user operation. In this embodiment, the first menu 111 serves as a GUI for the volume adjustment, and the second menu 112 serves as a GUI for the channel selection. However, those menus may be associated with other operations.

A user 120 is a user who performs an operation with respect to the input device 100. User's operation is performed, for example, when the user's face 122 is directed toward the input device 100, by a user's gesture of waving the user's hand 121 horizontally or vertically, swiping the hand 121 upward, downward, rightward, or leftward from a predetermined position or circling the hand 121. Then, the input device 100 recognizes the gesture and executes a predetermined processing according to the recognition result of the gesture.

Figure 2:
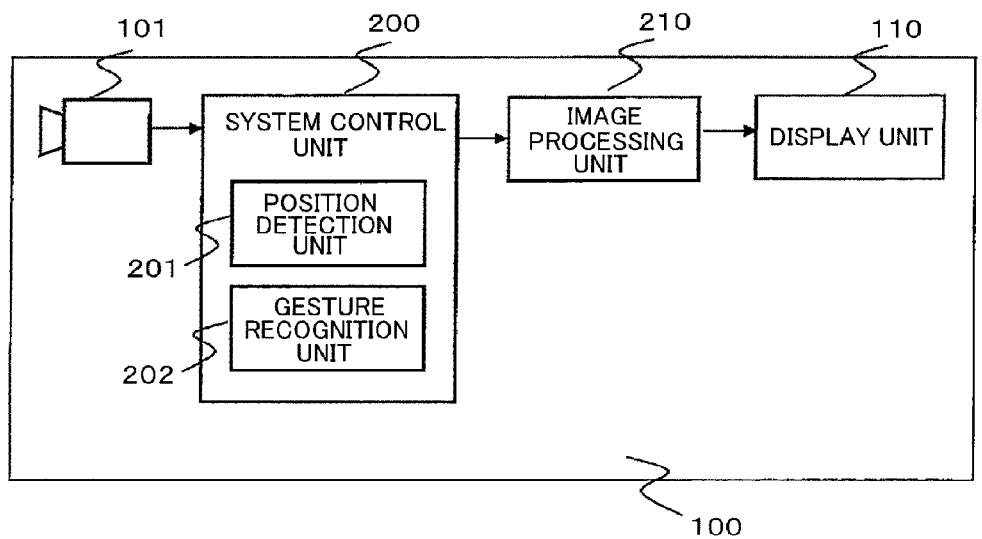
FIG. 2 is a block diagram showing a configuration of the input device according to the first embodiment.

FIG. 2 is a block diagram showing an example of the configuration of the input device 100. The input device 100 includes, for example, the imaging unit 101, a system control unit 200, an image processing unit 210, and a display unit 110, as shown in FIG. 2. The system control unit 200 includes a sub-unit which achieves functions of a position detection unit 201 and a gesture recognition unit 202.

The position detection unit 201 detects positions of user's body parts such as the hand, face and trunk from a moving image obtained from the imaging unit 101 by using, for example, such a processing as the shape detection algorithm or the like. The gesture recognition unit 202 is a unit which recognizes a predetermined gesture operating the input device 100 by using positional information of the user's hand detected by the position detection unit 201. Although this embodiment cites an example of recognizing a gesture of the hand, the present invention is not limited thereto. For example, the gesture recognition unit 202 may be configured so as to recognize a gesture of the face or leg or a combined gesture of multiple body parts.

The system control unit 200 is a unit which performs data processing of data such as the output from the position detection unit 201 and the output from the gesture recognition unit 202. The system control unit 200 may be achieved by CPU execution of a software module stored in the memory or by a dedicated hardware circuit.

The image processing unit 210 includes, for example, a processing unit such as ASIC, FPGA and MPU. The image processing unit 210 outputs image data of the GUI by converting into a format which can be processed by the display unit 110, in accordance with control by the system control unit 200.

When mounted on a TV or a monitor provided with a display device, the input device 100 enables the operation of such an apparatus by the user's gesture. Although FIG. 2 shows the input device 100 has a configuration including the display unit 100, the input device 100 needs not to necessarily be provided with the display unit 110. For example, the input device may be mounted on a disk player or the like not provided with a display unit in such a manner that the image is provided to the user by utilizing an external display unit connected to the disk player. Moreover, for example, a video camera provided with an imaging unit may be connected to a display unit, disk player or the like in such a manner that processing is performed by the display unit, disk player or the like based on the image captured by the video camera.

Although FIG. 2 shows a configuration used for illustrating this embodiment and other embodiments, it will be apparent to those skilled in the art that other configurations may be added, if necessary. For example, when the input device 100 is mounted on a TV which receives a broadcast, the TV may be provided with a tuner or demultiplexer used for reception and display of the broadcast, a decoder, a speaker which outputs the voice, or the like.

Figure 3:
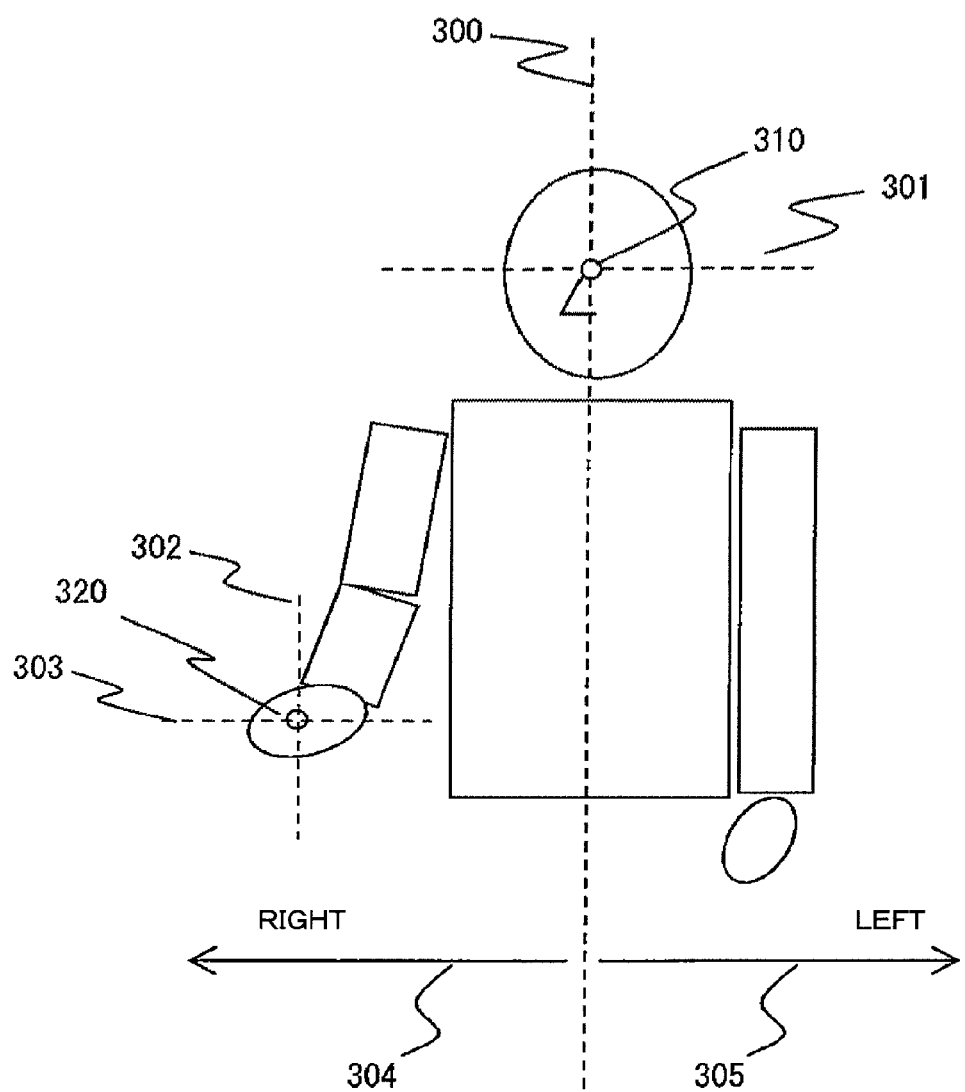
FIG. 3 is a schematic view showing the positions of the user's hand and face when the user operates the input device according to the first embodiment, FIGS. 4A and B are schematic views illustrating the position of the user's hand and corresponding display screens of the input device according to the first embodiment.

FIG. 3 shows a view of the user operating the input device by the gesture according to this embodiment. The position of the user's hand 121 is represented, for example, by a coordinate formed by a lateral position 302 at a center point 320 of a shape region of the detected hand and a longitudinal position 303 at the center point 320. The position of the user's face 122 is represented, for example, by a coordinate formed by a lateral position 300 at a center point 310 of the detected face and a longitudinal position 301 at the center point 310.

In this embodiment, a method of separating a detection range of the user's hand 121 to an operation region 304 located to the right of a line passing the lateral position 300 of the user's face and to an operation region 305 located to the left of the line is described.

Here, depending on the data processing by the system control unit 200, there are two modes in which the position of the hand 121 of the user performing a gesture is detected; that is, a mode in which the position of the hand 121 is detected in a region to the right of the lateral position 300 (operation region 304) of the user's face 122, and a mode in which the position of the hand 121 is detected in a region to the left of the lateral position 300 (operation region 305) of the face 122. In the input device 100 according to this embodiment, a different operation is allocated with respect to a predetermined gesture performed by the user depending on the two modes.

Figure 4A:
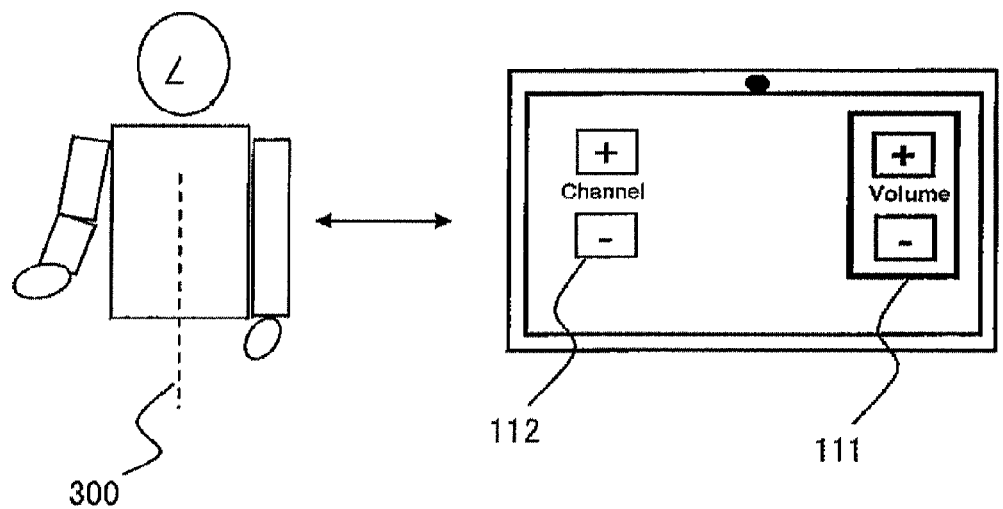

FIG. 4 shows schematic views of the display unit 110 when the user's hand 121 using the input device 100 is detected in the operation regions 304 and 305 respectively. FIG. 4A shows the user 120 and a mode of the display on the input device 100 when the user's hand is detected in the operation region 304. The input device 100 shows the user 120 by highlighting display of the first menu 111, or the like that an operation associated with the first menu (in this embodiment, volume adjustment) is executed when the user performs a predetermined gesture in this mode.

Figure 4B:
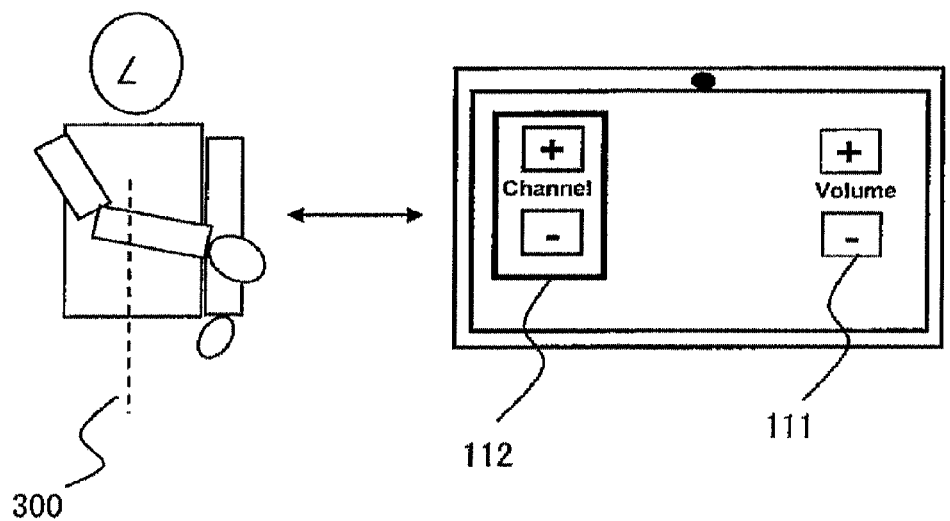

FIG. 4B shows the user 120 and a mode of the display screen on the input device 100 when the user's hand is detected in the operation region 305 (left to the face). The input device 100 shows the user 120 by highlighting display of the second menu 112, or the like that an operation associated with the second menu (in this embodiment, channel selection) is executed when the user performs a predetermined gesture in this mode.

Hereinafter, the operation of the input device 100 by the gesture according to the first embodiment is described using a flowchart shown in FIG. 5. Detection processing of the user's gesture is a processing performed by the system control unit 200 shown in FIG. 2.

Firstly, the system control unit 200 detects the positions of the user's hand 121 and the face 122, and calculates the position of the hand with respect to the face (Step 500).

According to the result in the Step 500, the system control unit 200 changes display of the GUI depending on the detected position of the hand with respect to the face (Step 501). As shown in FIG. 4, the first menu 111 is highlighted when the hand is detected to the right of the face, while the second menu 112 is highlighted when the hand is detected to the left of the face. This step enables the user to predict which operation is executed by the gesture which the user is going to perform.

Although this embodiment is configured so as to highlight a menu corresponding to the detected position of the hand, the display method is not limited thereto if a display allows the user to recognize which operation is executed by the gesture. For example, the display may be configured in such a manner that when the hand is detected to the right of the face, only the first menu 111 is highlighted, but not the second menu 112.

When no positional information of the hand and face exist due to detection failure of the hand and face, or the like, the display unit 110 displays neither the first menu 111 nor the second menu 112, for example.

Next, the system control unit 200 recognizes the gesture (Step 502), and, if a pre-registered gesture is not recognized, the system control unit 200 terminates the processing (Step 503: No). If the pre-registered gesture is recognized, the system control unit 200 proceeds to Step 504 (Step 503: Yes).

Next, the system control unit 200 determines whether the hand is to the right or to the left of the face (Step 504).

The system control unit 200 checks whether the determination result in the Step 504, that is, the position of hand with respect to the face, is consistent with the position of the GUI highlighted in the above Step 501 (Steps 505 and 506). If not consistent, the system control unit 200 terminates the processing without accepting the operation by the gesture (Step 505: No, and Step 506: No). If consistent, the system control unit 200 proceeds to Step 507 or Step 508 depending on the result of the Step 504 (Step 505: Yes, and Step 506: Yes).

Although the first menu 111 (a menu on the right side) is highlighted on the display unit 110, if the position of the hand is determined to be to the left of the face when the gesture is recognized according to the result in the Step 504 (Step 504: Left), the system control unit 200 assumes that a gesture recognition error occurs due to the inconsistency between the GUI display and an operation to be executed by the input device, and thus accepts no user's gestures.

When a gesture is recognized, if the position of the hand is determined to be to the right of the face, that is, if the position of the hand is detected in the operation region 304 shown in FIG. 3 (Step 504: Right), and the determination result thereof is consistent with a display of the GUI (Step 505: Yes), the input device 100 executes an operation associated with the first menu (in this embodiment, volume adjustment) (Step: 507).

Similarly, When a gesture is recognized, if the position of the hand is determined to be to the left of the face, that is, if the position of the hand is detected in the operation region 305 shown in FIG. 3 (Step 504: Left), and the determination result thereof is consistent with a display of the GUI (Step 506: Yes), the input device 100 executes an operation associated with the second menu (in this embodiment, channel selection) (Step: 508).

Thus, by recognizing the position of the hand with respect to the face, the user's predetermined gesture can be allocated to multiple operations, and thereby, the user can perform multiple operations without storing multiple gestures. Furthermore, since display of the first menu 111 is highlighted when the position of the hand is detected to the right of the face, and display of the second menu 112 is highlighted when the position of the hand is detected to the left of the face, the user can predict which operation applies to a gesture the user is going to perform. Furthermore, this also provides an effect to reduce the time for menu selection while operating the units, and thereby enables the user to perform a desired operation faster.

Furthermore, compared with the prior art which can be operated by the gesture, the processing load of operations by the gesture can be reduced as well.

In the embodiment described, a method of allocating the user's gesture to two types of operations using the two types of modes is described using the two modes, the two types of modes including a mode in which the position of the hand is to the right of the face, and a mode in which the position of the hand is to the left of the face. However, a mode in which the hand is above or below the face also may be used. Moreover, the user's gesture may be allocated to at least three types of operations by using such modes in which the position of the hand is to the upper left, the upper right, the lower right or the lower left of the face.

Second Embodiment

Hereinafter, a second embodiment is described with reference to FIGS. 6 to 8.

The input device 100 according to the first embodiment displays either a corresponding first or second menu by highlighting when the position of the hand is detected to the right or to the left of the face. In the present embodiment, the GUI displays the position where the user's hand is detected with respect to the face, in addition to the operation method according to the first embodiment.

Figure 6:
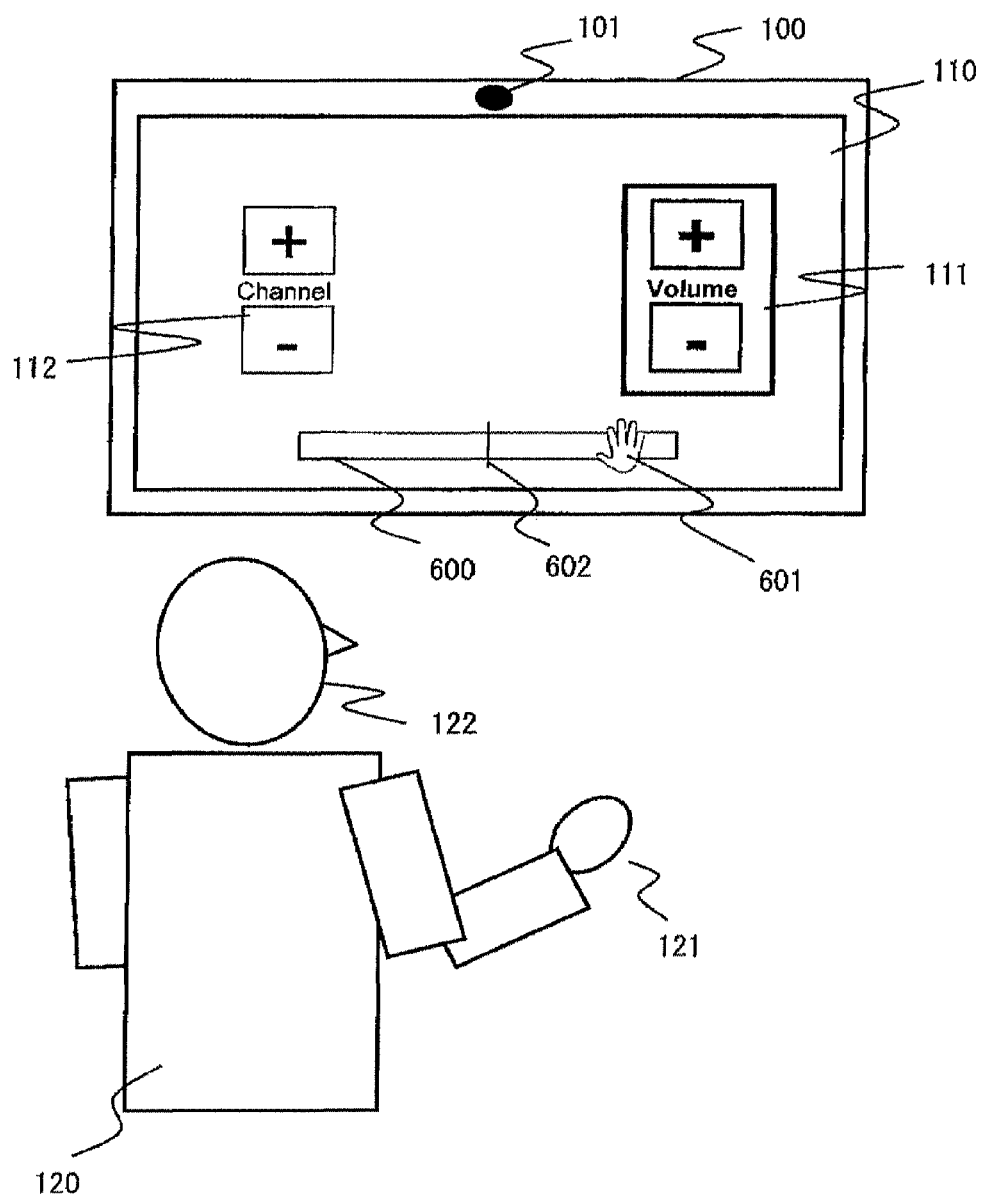
FIG. 6 is a schematic view showing an input device according to a second embodiment.

FIG. 6 is a schematic view showing the user operating an input device 100. A display unit 110 of the input device 100 is provided with an operation region display 600 indicating the region in which the user's hand is detected, and a GUI of a hand position indicator 601 indicating the position in which the user's hand is detected, in addition to the first menu 111 and the second menu 112 according to the first embodiment. The input device 100 displays the position where the user's hand is detected with respect to the face, using the operation region display 600 and the hand position indicator 601 in combination. A median line 602 is an intermediate boundary line separating the operation region display 600 to right and left portions. The user performs the gesture to operate the input device 100 while checking a screen on the display unit 110 of the input device 100.

Figure 7:
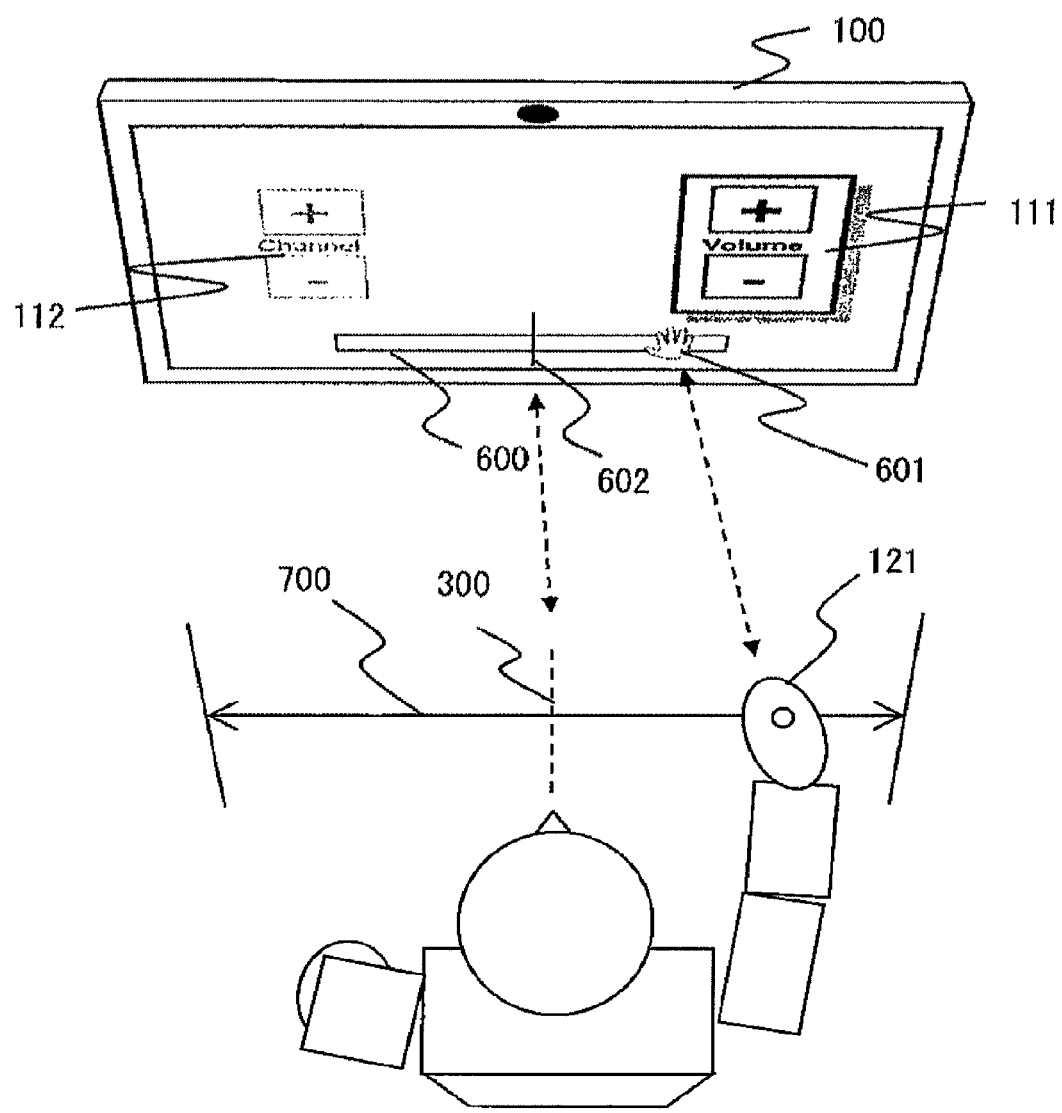
FIG. 7 is a schematic view of the input device according to the second embodiment, showing regions of the user's gesture operation, FIGS. 8A and B are schematic views of the input device according to the second embodiment, showing motions of the user's hand and corresponding display screens.

FIG. 7 shows a relation between the user and a screen displayed on the display unit 110 according to this embodiment. An operation region range 700 is a range in which the gesture can be recognized. According to this embodiment, a midpoint of the operation region range 700 corresponds to a face's lateral position 300. The lateral length of the operation region display 600 displayed on the display unit 110 represents the operation region range 700, and a median line 602 corresponds to the face's lateral position 300.

Figure 8A:
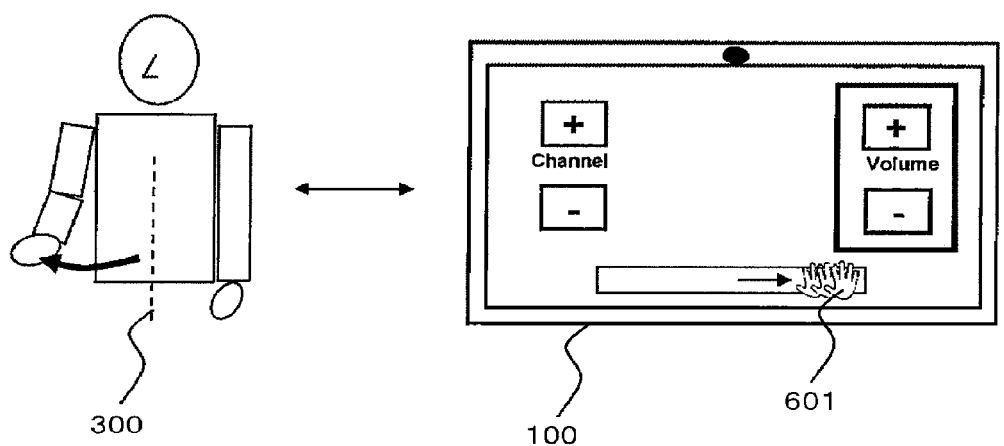
Figure 8B:
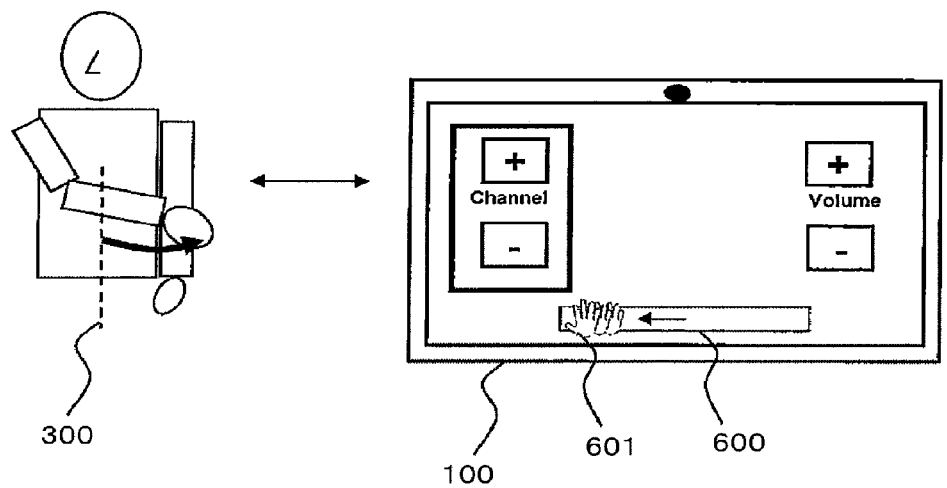

FIG. 8 is a schematic view of the input device 100 according to this embodiment, illustrating the position of the user's hand and a corresponding display screen. The position of the hand in the operation region 700 shown in FIG. 7 corresponds to the hand position indicator 601 in the operation region display 600. That is, when the user's hand 121 moves rightward in the operation region range 700, the position of the hand position indicator 601 is moved to the right of the operation region display 600 as shown in FIG. 8A. Similarly, when the user's hand 121 moves leftward in the operation region range 700, the position of the hand position indicator 601 is moved to the left of the operation region display 600 as shown in FIG. 8B.

With the above configuration, there is an advantageous effect that the user can identify the position of the user's hand by observing the position of the hand position indicator 601 in the operation region display 600.

Third Embodiment

Hereinafter, a third embodiment is described with reference to FIGS. 9 to 12.

The input device 100 according to the first and second embodiments is configured so as to set a predetermined reference position by using positional information of the face and allocate a different operation according to the relative position of the hand with respect to the reference position. In this embodiment, a method of allocating operations by the gesture by using a relative position of the user's hand with respect to other body parts is described.

Firstly, an imaginary boundary line extending longitudinally or laterally, or at a predetermined inclination is created with the user's body parts as a reference. The created imaginary boundary line produces at least two operation regions. In this embodiment, a method of allocating an operation to a predetermined gesture depending on the operation region in which the user's hand is detected is described. Hereinafter, an example of creating operation regions using the imaginary boundary line is described.

FIG. 9 is a schematic view showing operation regions of the user's hand with respect to the user's trunk axis according to this embodiment. The input device 100 detects a center point 900 of the user's trunk and the inclination of the trunk by using, for example, the position detection unit 201. A boundary line 901 passes through the detected center point 900 of the trunk, at an inclination thereof same as the inclination of the trunk.

The boundary line 901 thus created produces two operation regions for the hand; an operation region 902 and an operation region 903. Then, two types of operations are allocated to the operation of the input device 100 by the user's gesture; that is, an operation when the position of the hand is detected in the operation region 902, and an operation when the position of the hand is detected in the operation region 903.

Thus, according to the user's position, multiple operations can be allocated to the operation of the input device 100 by a gesture more appropriately and thereby user's usability can be improved. The imaginary line 901 may be created by other methods such as, for example, a method of defining the imaginary line using a line passing a center point 310 of the face and the center point 900 of the trunk.

FIG. 10 is a schematic view showing operation regions of the operation by the user's gesture with respect to the longitudinal position of the center point of the user's trunk according to this embodiment. When an imaginary boundary line 901-b extending laterally is created at the longitudinal position of the center point 900 of the trunk, operation regions 1000 and 1001 shown in FIG. 10 are produced.

Then, two types of operations are allocated to the operation of the input device 100 by the user's gesture; i.e. an operation when the position of the hand is detected in the operation region 1000, and an operation when the position of the hand is detected in the operation region 1001.

Thus, multiple operations can be allocated to the input device by a gesture when the hand is above the center point of the body and by a gesture when the hand is below the center point.

Figure 11:
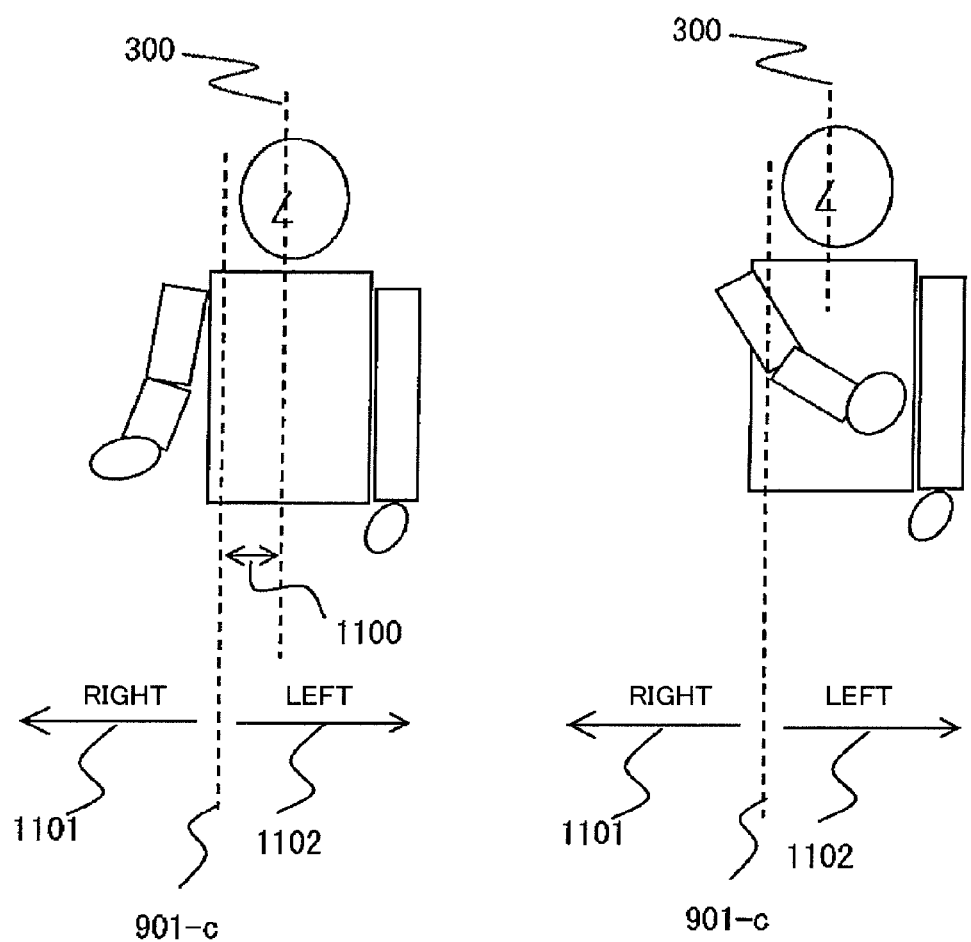
FIG. 11 is a schematic view of the input device according to the third embodiment, showing the operation regions with respect to an imaginary boundary line created by using positional information of the user's face.
Figure 12:
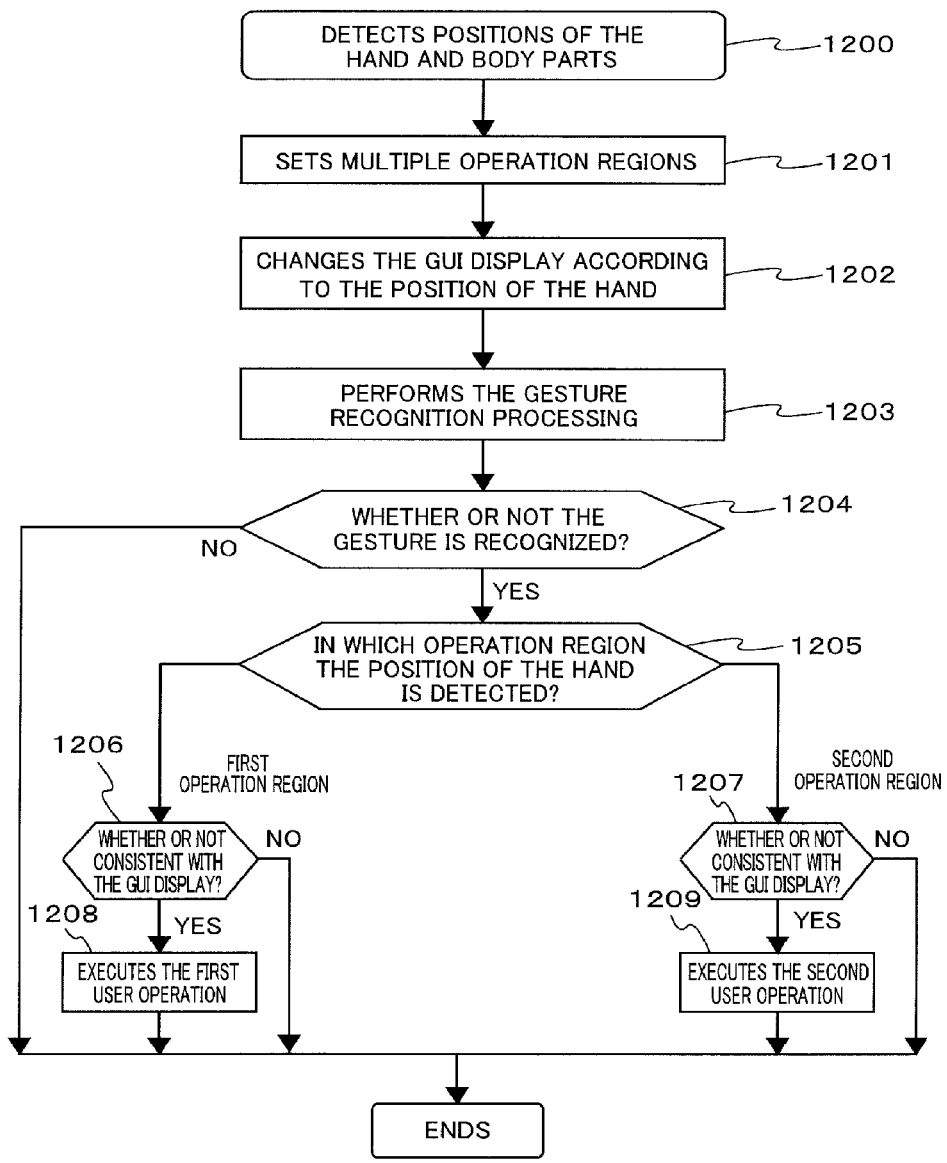
FIG. 12 is a flowchart illustrating the operations of the input device according to the third embodiment.

FIG. 11 is a schematic view showing the operation regions with respect to a boundary line created by using positional information of the user's face. It is considered that when operating the input device 100 by the gesture of the right hand, using a line passing through the center points of the face and trunk as the imaginary boundary line makes an operation allocated to the left of the line makes difficult compared with an operation allocated to the right side thereof. Therefore, an imaginary boundary line 901-c extending longitudinally is created at a position apart by a distance 1100 from the lateral position 300 of the user's face, and thereby operation regions 1101 and 1102 shown in FIG. 11 are produced. Two types of operations are allocated to the operation of the input device 100 by the user's gesture: i.e. an operation when the position of the hand is detected in the operation region 1101, and an operation when the position of the hand is detected in the operation region 1102.

By setting the imaginary boundary line 901-c to the right (or to the left when a gesture is performed with the left hand) of the longitudinal position of the face in such a manner, an operation by the user's right hand allocated to the left region becomes easier compared with an imaginary boundary line passing the center points of the face and trunk.

Furthermore, when the input device 100 determines by using, for example, the position detection unit 202 configured to determine whether the gesture is performed with a right hand or left hand, that the user performs the gesture with the left hand, the gesture of the left hand can be performed easily by setting the boundary line 901-c to the left of the face.

Hereinafter, a method of allocating two types of operations to the input device 100 with respect to a predetermined gesture according to this embodiment is described.

Detection processing of the input operation is a processing performed by the system control unit 200 shown in FIG. 2. Firstly, the system control unit 200 detects the position of the user's hand 121 and the position of a body part serving as a reference for creating operation regions (Step 1200).

Using positional information of the user's body part being the output in the Step 1200, the system control unit 200 creates, for example, an imaginary boundary line such as shown in FIGS. 9 to 11 to produce two operation regions (Step 1201).

Figure 5:
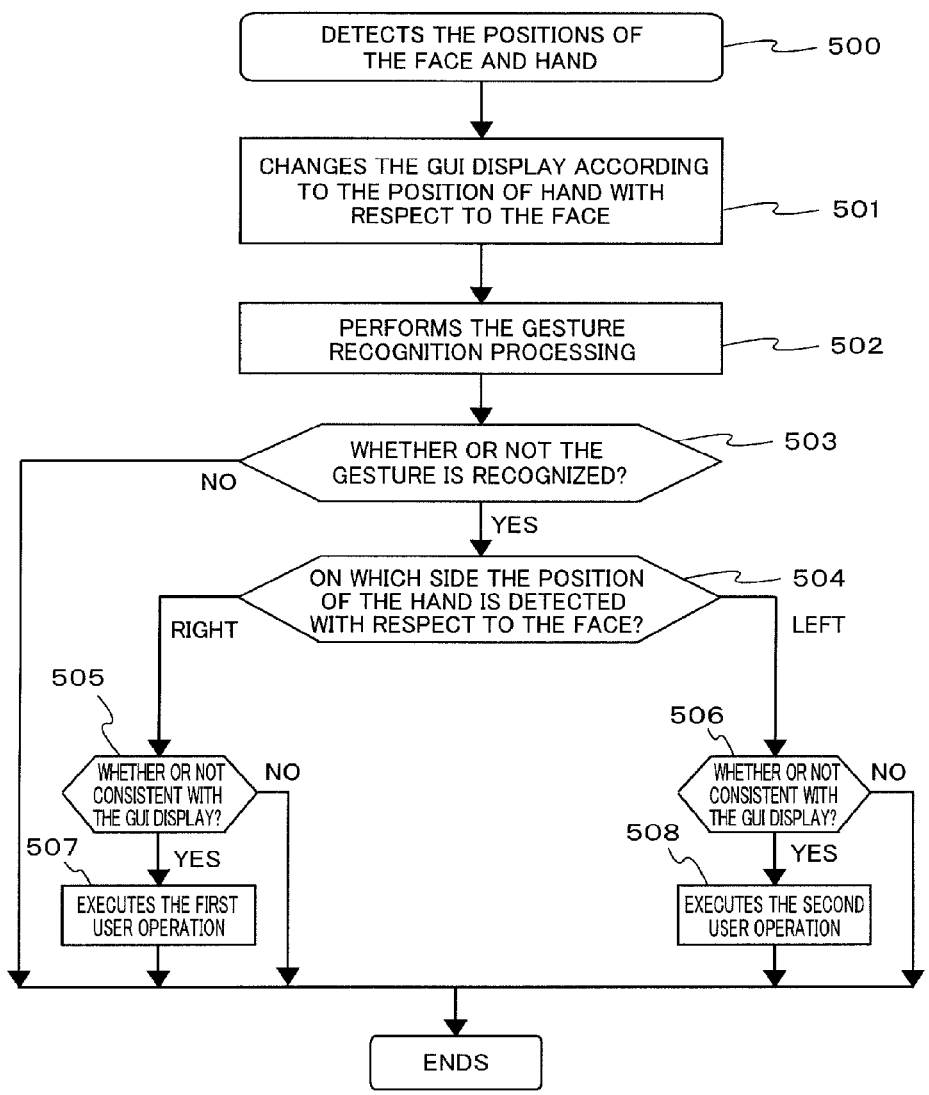
FIG. 5 is a flowchart illustrating the operations of the input device according to the first embodiment.

Next, similarly with the Step 501 in the flowchart of FIG. 5, the system control unit 200 changes the GUI display depending on the operation region in which the hand is detected (Step 1202).

Next, similarly with the Step 502 in the flowchart of FIG. 5, the system control unit 200 recognizes the gesture (Step 1203). If a pre-registered gesture is not recognized, the system control unit 200 terminates the processing (Step 1204: No). If the pre-registered gesture is recognized, the system control unit 200 proceeds to Step 1205 (Step 1204: Yes).

Next, the system control unit 200 determines whether the hand is detected in the first operation region or the second operation region (Step 1205).

Next, the system control unit 200 checks whether or not the determination result in the Step 1205 is consistent with the GUI processed in the Step 1202 (Steps 1206 and 1207). If not consistent, the system control unit 200 terminates the processing without accepting the operation by the gesture (Step 1206: No, and Step 1207: No). If consistent, the system control unit 200 proceeds to Step 1208 or Step 1209 depending on the result of the Step 1205 (Step 1206: Yes, and Step 1207: Yes).

For example, although the first menu 111 (a menu on the right side) is highlighted on the display unit 110 in the Step 1202, if, when the gesture is recognized, the position of the hand is determined to be to the left of the face according to the result in the Step 1205, the system control unit 200 assumes that a gesture recognition error occurs due to the inconsistency between the GUI display observed by the user and an operation to be executed by the input device, and accepts no operations by the user's gesture.

If, when a gesture is performed, the position of the hand is in the first operation region (Step 1205: first operation region) and the determination result thereof is consistent with a displayed GUI (Step 1206: Yes), the input device 100 executes a first user operation (Step: 1208). Similarly, if, when a gesture is performed, the position of the hand is in the second operation region (Step 1205: second operation region) and the determination result thereof is consistent with a displayed GUI (Step 1207: Yes), the input device 100 executes a second user operation (Step 1209).

In such a manner, the imaginary boundary line and the operation regions are defined using positional information of user's body parts. By setting two modes of operations according to the operation region where the position of the hand is detected, two types of user's operations can be allocated to the operation of the input device 100 when a predetermined gesture is performed. The imaginary boundary line may be configured in such a manner as to be set appropriately according to a method of separating into operation regions where the position of the user's hand is recognized. For example, if the operation region where the position of the user's hand is recognized is desired to be separated into left and right parts, the imaginary boundary line may be defined with a line passing through the center point 310 of the user's face and the center point 900 of the user's trunk. Furthermore, if the operation region where the position of the user's hand is recognized is desired to be separated into upper and lower parts, the imaginary boundary line may be defined with a line linking both ends of the user's shoulder. Moreover, at least two imaginary boundary lines can be defined to create at least three regions where the position of the user's hand is recognized. In such a manner, at least three types of operations can be allocated to a predetermined gesture.

Fourth Embodiment

Hereinafter, a fourth embodiment is described with reference to FIGS. 13 to 15.

In the first, second and third embodiments, methods for allocating multiple operations to the input device 100 by using such modes in which the position of the hand is to the right or left of, or below or above a predetermined reference position are described. In this embodiment, a method for allocating multiple operations to the input device 100 by using a distance of the hand from a predetermined reference position is described.

Figure 13:
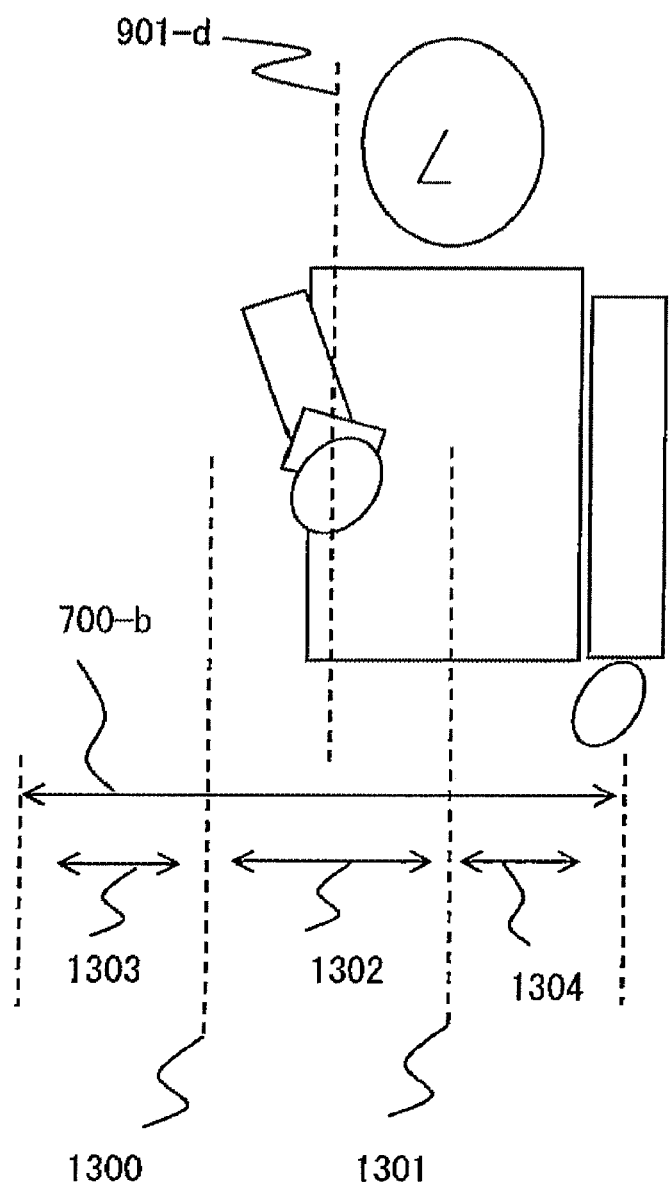
FIG. 13 is a schematic view of an input device according to a fourth embodiment, showing regions of the user's gesture operation, FIGS. 14A, B, and C are schematic views of the input device according to the fourth embodiment, illustrating the position of the user's hand and corresponding display screens.

FIG. 13 shows the user operating the input device 100 according to this embodiment. An operation boundary line 901-d is an imaginary operation boundary line which is set, for example, from the positions of predetermined body parts (face, shoulder, or the like). Here, imaginary boundary lines (a boundary line 1300 on the right side, and a boundary line 1301 on the left side, as viewed from the user) are set each on both right and left sides of the operation boundary line 901-d such that a first operation region 1302, a second operation region 1303 and a third operation region 1303 are produced, the imaginary boundary lines being each apart rightward and leftward by a predetermined distance from the operation boundary line 901-d. Then, three conditions are set according to the operation region in which the position of the hand is detected when the user operates the input device by the gesture; the three conditions including: a case where the position of the hand is detected in the first operation region 1302, a case where the position of the hand is detected in the second operation region 1303, and a case where the position of the hand is detected in the third operation region 1304. Then, using the three conditions, a different operation is allocated to the input device 100. An operation region range 700-b is similar with the operation region range 700 shown in FIG. 7.

FIG. 14 shows the positions of the user's hand and corresponding display screens on the display unit 110 of the input device 100 when the user's hand is detected in the above three operation regions.

Figure 14A:
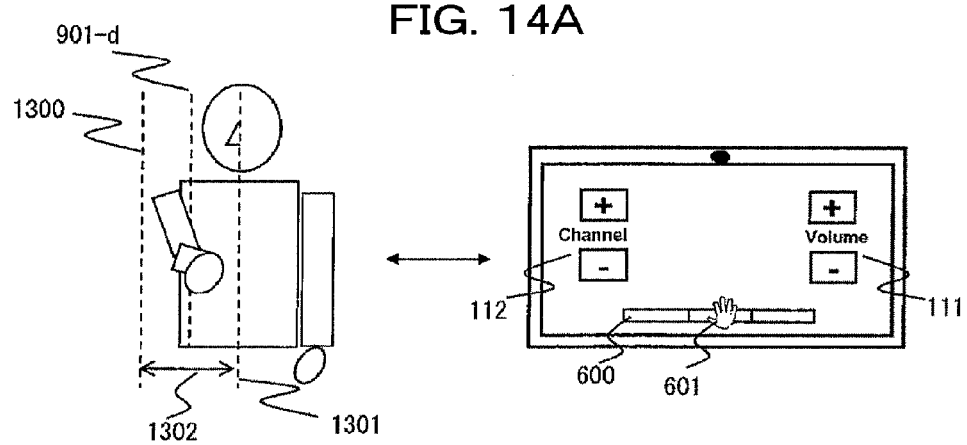
Figure 15:
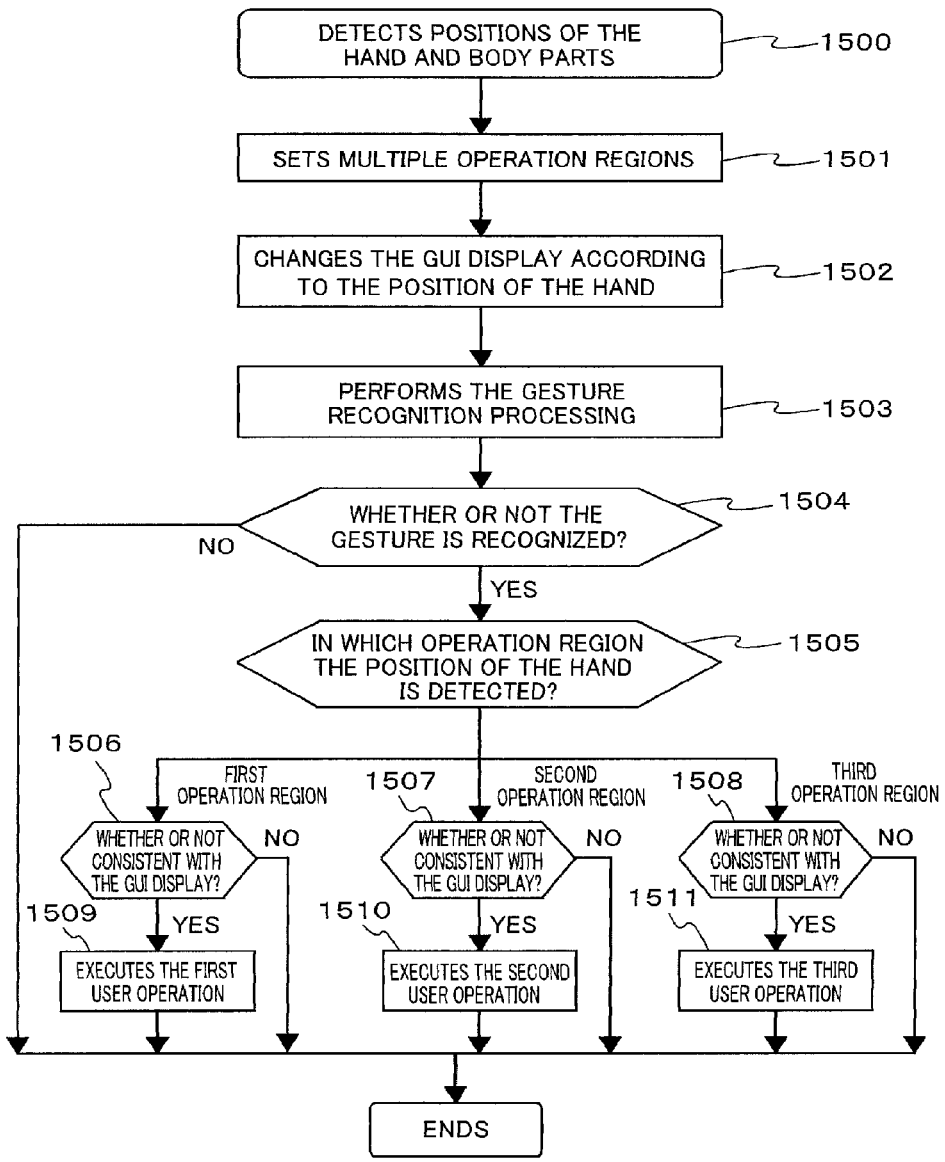
FIG. 15 is a flowchart illustrating the operations of the input device according to the fourth embodiment.

FIG. 14A shows a relation between the user and a screen on the display unit 110, when the user's hand is detected in the first operation region 1302. The display unit 110 displays a first menu 111 and a second menu 112. To indicate that both of the menus are not operable, for example, display intensity of those menus may be reduced. A hand position indicator 601 in an operation region display 600 is displayed in the vicinity of the middle position thereof. In this embodiment, no operation is allocated to the region, so that the user cannot operate the input device 100 even when the gesture is performed.

Figure 14B:
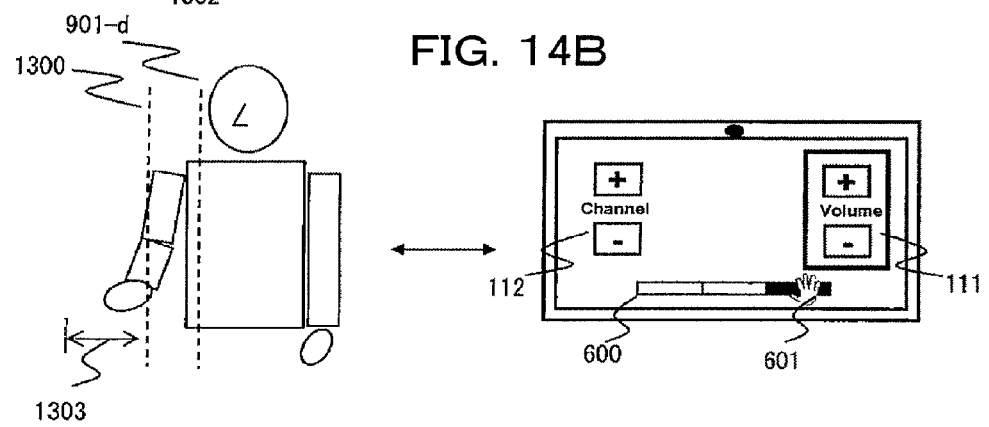

FIG. 14B shows relation between the user and a screen on the display unit 110 when the user's hand is detected in the second operation region 1303. On the display unit 110, the first menu 111 is highlighted more intensively than the second menu 112, showing the user that an operation shown by the first menu 111 is available by performing a predetermined gesture. The operation region display 600 displays the hand position indicator 601 on the right side. Then, when the user performs the gesture, the first operation (in this embodiment, volume adjustment) is executed to the input device 100.

Figure 14C:
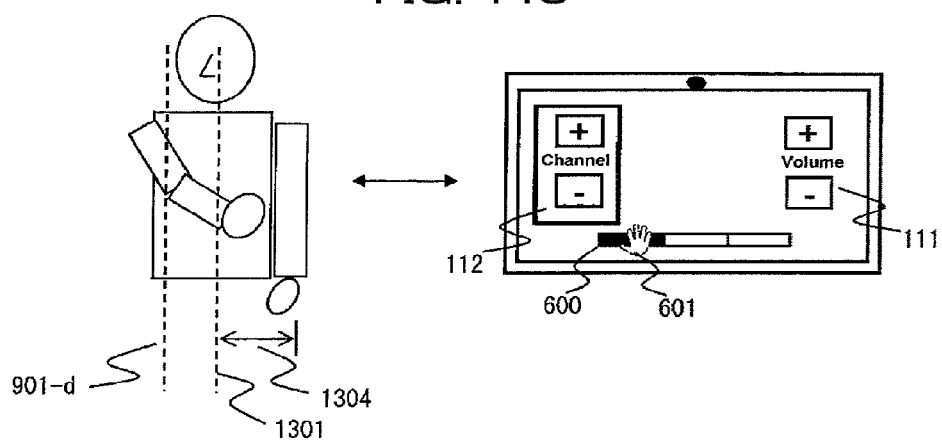

FIG. 14C shows a relation between the user and a screen on the display unit 110 when the user's hand is detected in the third operation region 1304. On the display unit 110, the second menu 112 is highlighted more intensively than the first menu 111, showing the user that an operation shown by the second menu 112 is available by performing a predetermined gesture. The operation region display 600 displays the hand position indicator 601 on the left side. Then, when the user performs the gesture, the second operation (in this embodiment, channel selection) is executed to the input device 100.

Hereinafter, a method for allocating a predetermined gesture operation according to this embodiment to multiple operations is described with reference to a flowchart shown in FIG. 15.

Firstly, the system control unit 200 detects the positions of the user's hand 121 and a body part serving as a reference for creating operation regions (Step 1500). FIG. 13 shows that the user's shoulder serves as a reference for setting the operation regions.

Using positional information of the user's body part which is the output in the Step 1500, the system control unit 200 determines an imaginary boundary line, for example, as shown in FIG. 13 and defines three types of operation regions, each of which being apart by a predetermined distance from the imaginary boundary line (Step 1501).

Then, the system control unit 200 changes the GUI display according to the operation region where the hand is detected (Step 1502). As shown in FIG. 14, the GUI display is changed according to the operation region where the user's hand is detected.

Although this embodiment is configured such that a menu associated with the detected position of the hand is highlighted, the display method is not limited thereto so far as a display is configured in such a manner that the user can recognize the type of an operation which will be executed by the gesture. For example, it may be configured in such a way that when the hand is detected in the operation region 1303, only the first menu 111 is displayed, but not the second menu 112, and when the hand is detected in the operation region 1302, no menu is displayed. Furthermore, it may be configured in such a manner that the operation region display 600 and the hand position indicator 601 are not displayed.

Next, the system control unit 200 performs the gesture recognition processing (Step 1503). If a pre-registered gesture is not recognized, the system control unit 200 terminates the processing (Step 1504: No). If the pre-registered gesture is recognized, the system control unit 200 proceeds to Step 1505 (Step 1504: Yes).

Next, the system control unit 200 determines whether the hand is detected in the first operation region, the second operation region or the third operation region (Step: 1505).

Next the system control unit 200 checks whether or not the determination result in the Step 1505 is consistent with the GUI displayed according to the processing in the Step 1502 (Step 1506, Step 1507, and Step 1508). If not consistent, the system control unit 200 terminates the processing without accepting the operation by the gesture (Step 1506: No, Step 1507: No, and Step 1508: No). If consistent, the system control unit 200 proceeds to Step 1509, Step 1510 or Step 1511 depending on the result in the Step 1505.

For example, although the display unit 110 highlights the first menu 111 (a menu on the right side) in the Step 1502, if the detected position of the user's hand determined in the Step 1505 is the left region 1304, the system control unit 200 accepts no user's operations by the gesture.

When the gesture is performed, if it is determined that the user's hand is detected in the first region (Step 1505: first operation region) and the determination result thereof is consistent with a GUI displayed as a result of processing in the Step 1502 (Step 1506: Yes), the input device 100 executes the first user operation (Step 1509).

In a similar manner, if it is determined that the user's hand is detected in the second region or in the third region when the gesture is performed, the input device 100 executes a corresponding user operation (Step 1507, Step 1510, Step 1508, Step 1511).

Thus, by defining multiple operation regions depending on a distance from a boundary line which is set based on the positions of the user's predetermined body parts, multiple operations can be allocated to the input device 100 according to the position where the user's hand is detected.

Although this embodiment cites three operation regions as an example, the number of operation regions may be reduced or increased by reducing or increasing the number of boundary lines. Furthermore, in this embodiment, a boundary line is set based on predetermined body parts, and multiple operation regions are set depending on a distance from the boundary line. However, it may be configured such that multiple operation regions are set depending on a distance from a predetermined body part without setting a boundary line.

Fifth Embodiment

Hereinafter, a fifth embodiment is described with reference to FIG. 16.

In this embodiment, a method of defining user's gestures operating the input device 100 using the positions of predetermined body parts.

In prior arts, a swiping gesture is defined when the hand continuously moves rightward or leftward from a position to another position within a camera's image capturing range over a specific time period. However, since information of the camera's image capturing range is used, a same swiping gesture performed by a user may not be recognized in some cases due to the difference in the user's body height or depending on the distance from an input device to a place where the user operates the input device.

In this embodiment, the swiping gesture is defined with the position of a user's body part actually captured, instead of the camera's image capturing range.

FIG. 16 is a schematic view showing a gesture performed by the user with respect to an input device 100 according to this embodiment. For example, a gesture 1600 is defined to be formed when the user's hand moves from the operation region 1302 to the operation region 1304. Since the position of a boundary line 1201 is set based on positional information of detected user's body parts, the size of the operation regions 1302 and 1304 vary according to the size and position of the user's body. Thus, the input device can be operated appropriately even by multiple users of different body heights or body builds or by a same user operating from different positions.

By defining the gesture by using positional information of body parts in such a manner, operation of the input device 100 by a gesture capable of processing a change of the user or the operation position can be achieved.

Positions of body parts such as center points of the face and trunk detected by the input device 100 may be used as a reference for defining other gestures (such as hand waving, hand circling, or the like). For example, the input device may be configured in such a manner as to determine as the gesture of circling the hand when the user's hand is moving around the center point of the trunk, when the circling radius of the user's hand is within a predetermined range calculated on the basis of the lateral width of the trunk, or the like.

Although the above first to fifth embodiments are described on assumption of a device which includes the display unit 110 configured to display an image and the video processing unit 210, the present invention is not limited thereto. If a device includes a camera configured to capture the image and a control unit configured to control the device on the basis of the image captured by the camera, operations of the device by the gesture described in the above first to fifth embodiments are possible based on the user's image captured by the camera. In this case, menus cannot be highlighted, but multiple operations can be allocated to a same gesture. Moreover, the device may be configured in such a manner that an operation corresponding to the gesture is shown to the user by light emitting elements (by utilizing the position or light color of the light emitting elements, or the like) such as LED (Light Emitting Diode) provided in the device, instead of the menu highlighting. The input device also may be configured in such a manner that the processing described in the above embodiments is executed by a software application.

A device including an imaging element such as a camera can provide functions and effects similar with those described in the above embodiments by executing software capable of performing the processing described in the above embodiments by using CPU of the device.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image display device comprising:
   a display that displays an image based on an input image signal and a menu screen operable by a user; and
   a system controller circuitry that controls the image display device according to an operation of the user on the menu screen displayed on the display,
   wherein the menu screen includes a first menu screen displayed on one of the left and right of a screen of the display and a second menu screen displayed on the other,
   the system controller circuitry is configured to detect a position of a hand of the user based on a captured image of the user, recognize a gesture of the user, and determine an operation on the menu screen by the gesture,
   when the operation on the menu screen is performed by the gesture, the system controller circuitry is further configured to control the display to display the first menu screen in response to a detection of the hand of the user to be positioned on one of the left and right with respect to a predetermined reference position, to display the second menu screen in response to a detection of the hand of the user to be positioned on the other of the left and right, and to display neither the first menu screen nor the second menu screen when the hand of the user is detected neither on the one nor on the other,
   wherein a control operation of the first menu screen in response to the hand of the user on one of the left and right is different from a control operation of the second menu screen in response to the hand of the user on the other of the left and right,
   wherein the system controller circuitry controls the display to display an indicator which indicates a relative position of the hand of the user with respect to the predetermined reference position and moves on the screen of the display according to a position of the hand of the user, and
   wherein the system controller circuitry further controls the first menu screen to be active when the indicator is displayed on the one of the left and right of the screen of the display in a state of displaying the first menu screen, and controls the second menu screen to be active when the indicator is displayed on the other of the left and right of the screen of the display in a state of displaying the second menu screen.

2. The image display device according to claim 1, wherein the first menu screen is a screen for performing volume control, and the second menu screen is a screen for switching the image signal.

3. The image display device according to claim 2, wherein the second menu screen is a screen for switching a channel of television broadcasting.

4. The image display device according to claim 1, wherein, among the first menu screen and the second menu screen, the menu screen which is active is highlighted more intensively than the other.

* * * * *